Patented June 15, 1926.

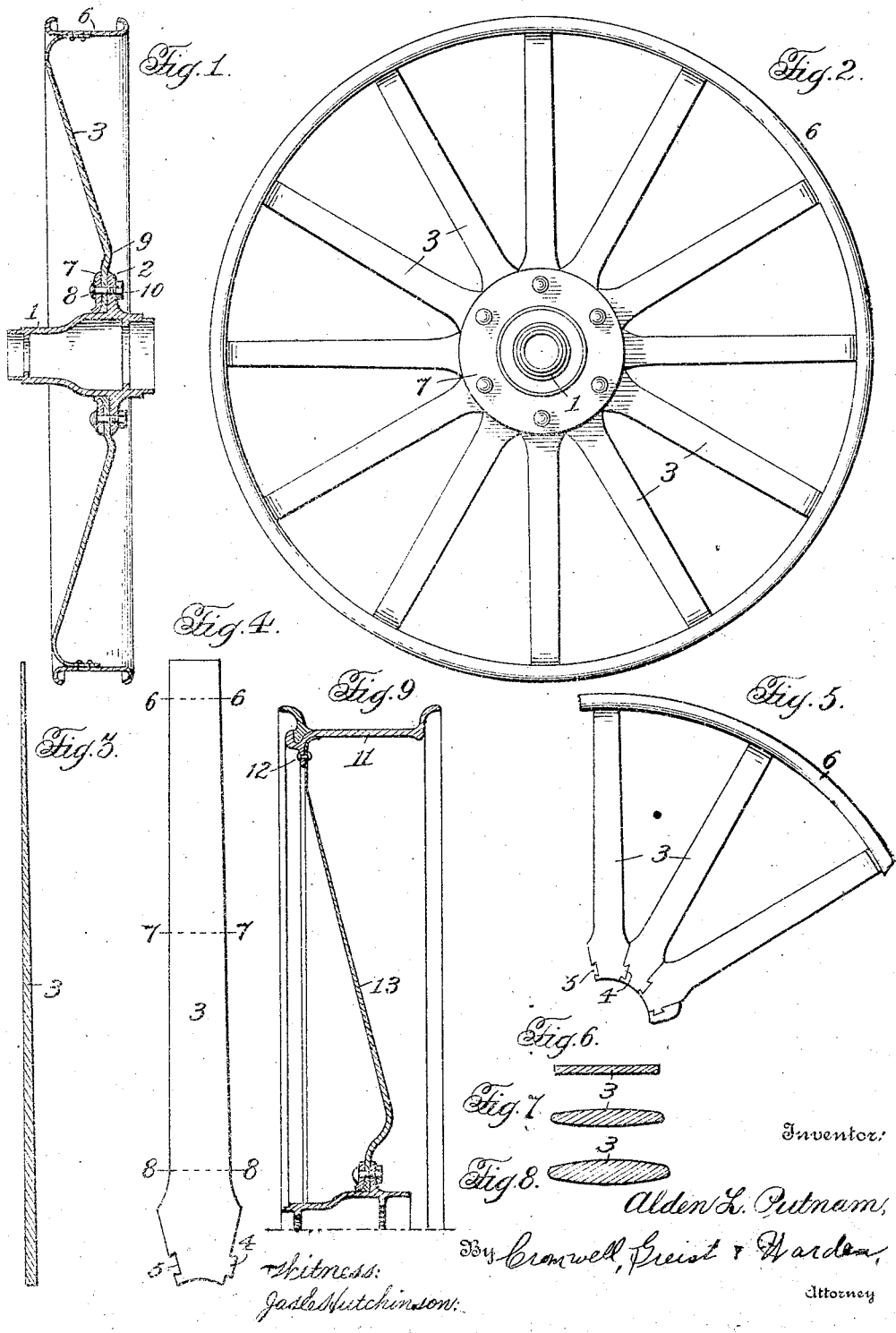

1,588,494

UNITED STATES PATENT OFFICE.

ALDEN L. PUTNAM, OF LANSING, MICHIGAN, ASSIGNOR TO MOTOR WHEEL CORPORATION, OF LANSING, MICHIGAN.

VEHICLE WHEEL.

Application filed May 18, 1923. Serial No. 639,776.

My invention relates to vehicle wheels, and its purposes are to make a wheel that shall be strong, resilient, in which the strains shall be so distributed as to avoid crystallization, and that shall be cheap in construction and simple in assembly.

I attain these purposes by the means shown in the accompanying drawings in which Fig. 1 is a vertical section of a wheel, embodying my invention. Fig. 2 is an elevation. Figure 3 is a detail longitudinal section of one of the spokes. Figure 4 is a side elevation of one of the spokes. Figure 5 is a detail side elevation illustrating the method of assembly where the spider instead of being integral is made up of individual spokes. Figures 6, 7 and 8 are transverse sections, on an enlarged scale, on lines 6—6; 7—7; and 8—8 of Figure 4. Figure 9 is a sectional view illustrating a modified construction.

Referring to the drawings, 1 is the hub which may be of any approved construction. It is provided with a flange 2, extending in a substantially radial direction.

The spokes 3 are tapered longitudinally and transversely as shown in Figures 3, 4, 6, 7, and 8. The inner extremities of the spokes are provided with projections 4 and dovetail notches 5. In assembly the projection 4 of one spoke engages with the notch 5 of the adjacent spoke, thus holding the wheel together during the process of assembly. The completed spokes are rearwardly dished as shown in Fig. 1 and formed at the outer extremity so as to be attached by riveting, welding, or in any other suitable manner to the rim 6. At the inner extremities, the spokes are clamped between a ring 7 and the flange 2 and held by bolts, rivets or the like, the securing means, in the particular construction illustrated in the drawing, being shown as bolts 8 and nuts 10. The spokes are also preferably provided near their inner extremities with slight offsets 9.

While I have indicated the preferred form and the arrangement of the spokes, I do not desire to limit myself to the precise construction shown in the drawings, but the curvature of the spokes, their form in cross-section, and the interlocking, abutting or integral union at their inner ends, as well as their connection to the rim at their outer ends, may be considerably varied without departing from my invention. For example, in Fig. 9 I have shown a construction of the spoke adapted to a type of rim 11 which is provided with an inwardly extending flange 12. In this construction, instead of being recurved as shown in Fig. 1, the spoke 13 extends substantially parallel with the flange 12 and is riveted to it. Many other modifications will readily suggest themselves and are considered to be within the scope of my invention.

Claims—

1. A metallic spoke for vehicle wheels, provided at its inner extremity with means for locking a plurality of spokes together to form a complete spider, said means comprising a transversely extending dovetail notch on one side of said inner extremity and a projection on the opposite side adapted to engage with and fit the corresponding notch on the adjacent spoke.

2. In a vehicle wheel, a metallic spider connecting the hub to the felly comprising a single series of spokes lying in a common surface of revolution disposed at an inclination to the wheel plane, said spokes being of substantially greater width than thickness and tapered longitudinally from the hub and transversely toward the edge.

3. In a vehicle wheel, a metallic spider connecting the hub to the felly comprising a single series of spokes lying in a common surface of revolution, the major portion of each spoke being arranged in a substantially straight line oblique to the wheel plane, said spokes being of substantially greater width than thickness and tapered longitudinally from the hub.

ALDEN L. PUTNAM.